(12) United States Patent
Yazdanian et al.

(10) Patent No.: US 12,119,764 B2
(45) Date of Patent: Oct. 15, 2024

(54) ESTIMATING INPUT CURRENTS PROVIDED TO AN ELECTRIC MOTOR

(71) Applicant: Rivian IP Holdings, LLC, Plymouth, MI (US)

(72) Inventors: Mehrdad Yazdanian, Carson, CA (US); Younes Sangsefidi, Irvine, CA (US); Kang Wang, Palos Verdes Estates, CA (US); Chou Yeh, Torrance, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 17/744,897

(22) Filed: May 16, 2022

(65) Prior Publication Data

US 2023/0370007 A1 Nov. 16, 2023

(51) Int. Cl.
*H02P 27/08* (2006.01)
*H02P 23/14* (2006.01)

(52) U.S. Cl.
CPC .................................. *H02P 23/14* (2013.01)

(58) Field of Classification Search
CPC ........................................................ H02P 21/22
USPC ......................................................... 318/445
See application file for complete search history.

(56) References Cited

U.S. PATENT DOCUMENTS

| 7,511,439 | B2 * | 3/2009 | Bosch | H02P 6/22 |
| | | | | 318/254.1 |
| 9,240,749 | B2 * | 1/2016 | Green | H02P 27/085 |
| 9,702,315 | B1 * | 7/2017 | Palmer | G07C 5/008 |
| 2016/0373047 | A1 * | 12/2016 | Loken | H02M 7/53875 |
| 2018/0302008 | A1 * | 10/2018 | Mori | H02P 27/085 |
| 2023/0129213 | A1 * | 4/2023 | Lee | H02M 7/53871 |
| | | | | 318/400.09 |

\* cited by examiner

*Primary Examiner* — Gabriel Agared
(74) *Attorney, Agent, or Firm* — BAKERHOSTETLER

(57) ABSTRACT

Systems and methods for estimating input current are provided, particularly when input currents are applied to an electric motor of a motor system. An Electric Control Unit (ECU), according to one implementation, is configured to control the motor system. The ECU is configured to store computer logic having instructions that, when executed, cause one or more processing devices to obtain a duty cycle parameter at an output of the ECU. The duty cycle parameter, for example, relates to control actions enforced on one or more switches of a power electronics circuit of the motor system. Based on the duty cycle parameter, the instructions further cause the one or more processing devices to estimate an input current provided to the electric motor of the motor system. A more accurate input current estimation may thereby be used to better estimate torque.

20 Claims, 9 Drawing Sheets

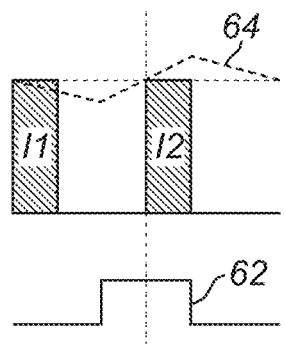
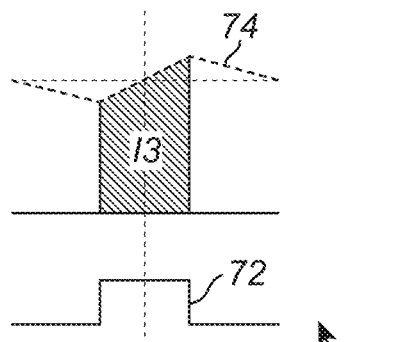
FIG. 5A          FIG. 5B
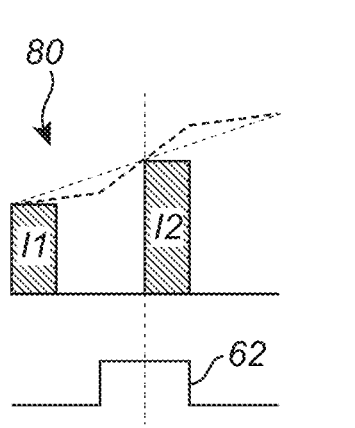
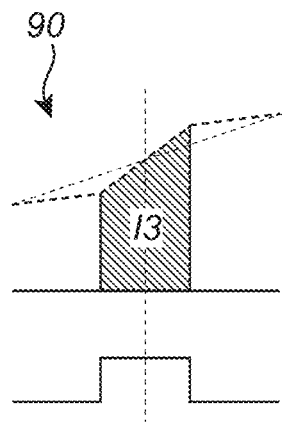
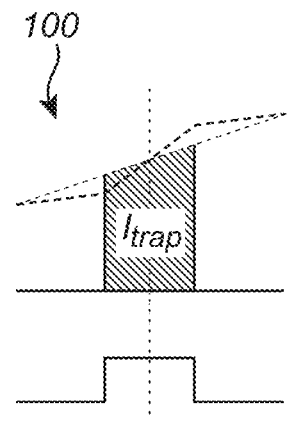
FIG. 6A          FIG. 6B          FIG. 6C
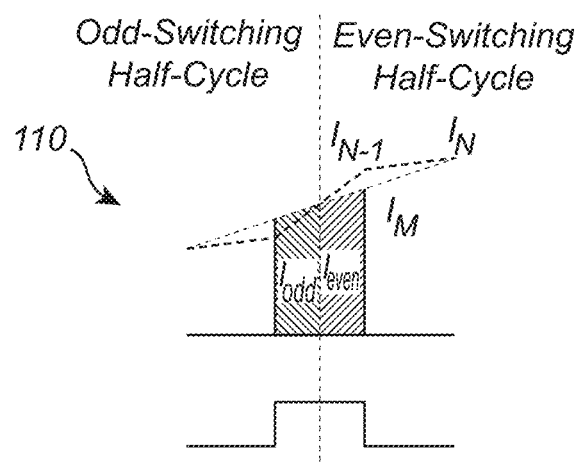
FIG. 7

ESTIMATING INPUT CURRENTS PROVIDED TO AN ELECTRIC MOTOR

INTRODUCTION

The present disclosure generally relates to electric motors. More particularly, the present disclosure relates to estimating the DC input current provided to an electric motor used, for example, to power an electric vehicle.

It can be advantageous to accurately measure the torque of an electric motor, for example, in an Electric Drive Unit (EDU), or "drive unit" of an electric vehicle. In some cases, torque can be calculated by estimating the input current to the electric motor. In such cases, it is desirable to accurately estimate torque calculations across different motors and inverters using accurate input current estimates.

BRIEF SUMMARY

The present disclosure is directed to systems and methods for estimating input currents in an electric motor. According to one implementation, a process may include the step of obtaining a duty cycle parameter at an output of an Electric Control Unit (ECU) configured to control a powertrain of an electric vehicle. The duty cycle parameter relates to control actions enforced on one or more switches of a power electronics circuit of the powertrain. Based on the duty cycle parameter, the process may further be configured to estimate an input current provided to an electric motor of the powertrain.

In some embodiments, the power electronics circuit may include three branches for controlling three phases of the electric motor, respectively, and wherein each branch includes two switches for controlling the respective phase to thereby allow the power electronics circuit to employ a six-step operation. The process may further include a) obtaining a duty cycle parameter for each of the three phases, and b) estimating an input current for each of the three phases based on the duty cycle parameter associated with each phase.

The step of obtaining the duty cycle parameter may include analyzing an input waveform applied to the one or more switches. Furthermore, analyzing the input waveform may include taking switching non-idealities into account. For example, the switching non-idealities may include one or more of deadtime, a smart clamp function, current direction, non-linear turn-on delay, non-linear turn-off delay, and a Fundamental frequency to Switching frequency (F2S) ratio.

The process may further include the step of feeding the duty cycle parameter at the output of the ECU to a control module of the ECU to compensate for switching non-idealities. The process may also include estimating torque of the electric motor based on the input current estimation. The step of estimating the input current may further include the step of employing a trapezoidal estimation technique based on an analysis of a trapezoidal area under a variable waveform of the input current.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIGS. 5A and 5B are graphs illustrating a method for calculating input current, according to various embodiments.

FIGS. 6A-6C are graphs illustrating a method for calculating input current using a trapezoidal estimation approach, according to various embodiments.

FIG. 7 is a graph illustrating a trapezoidal estimation method, according to various embodiments.

DETAILED DESCRIPTION

The present disclosure relates to systems and methods for accurately measuring or estimating currents in a drive unit (e.g., Electric Drive Unit (EDU)) or powertrain of an electric vehicle. Particular, the systems and methods of the present disclosure are configured to measure currents in the non-linear (e.g., six-step) operation of a drive unit that can provide increased torque delivery capability.

The embodiments of the present disclosure may employ a more detailed model of the drive unit physics. As described below, the embodiments may employ a trapezoidal calculation for DC current, which can be accurate for six-step operation of inverters at high speeds. The solutions described herein result in higher accuracy and provide more accurate information, which can also be used for Electronic Control Units (ECUs) for controlling a powertrain, Battery Management Systems (BMSs) for monitoring safe-operating characteristics of batteries with respect to voltage, current, State of Charge (SoC), temperature, cell balancing, etc.

I. General System

Figure 1:
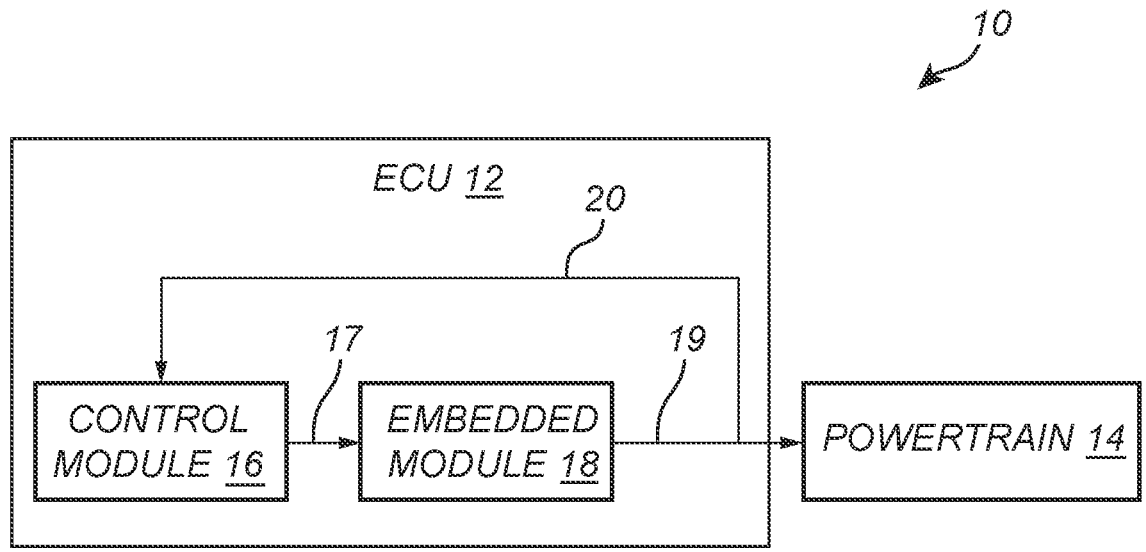
FIG. 1 is a block diagram illustrating an electrical power system, according to various embodiments of the present disclosure.

FIG. 1 is a block diagram illustrating an embodiment of an electrical power system 10, which may be used for powering an electric vehicle. In this embodiment, the electrical power system 10 includes an Electronic Control Unit (ECU) 12 and a powertrain 14 (e.g., Electric Drive Unit (EDU), physical plant, etc.). According to some embodiments, the ECU 12 may be configured as or may be a part of an Electronic Control Module (ECM), a Powertrain Control Module (PCM), or the like. In addition to one or more processing devices (not shown), the ECU 12 may include a control module 16 that outputs a first duty cycle 17 and an embedded module 18 that outputs a second duty cycle 19. The control module 16 and embedded module 18 may be configured as software or firmware components stored in a memory device (not shown) and/or may be configured as hardware components of one or more processing devices. The ECU 12 further includes a feedback loop 20 for feeding the second duty cycle 19 at the output of the embedded module 18 back to the control module 16.

Systems that are unable to provide high accuracy with respect to estimating input currents in the powertrain 14 may not incorporate changes to duty cycle of a switching waveform. Further, these systems may not incorporate switching non-idealities (e.g., portions of a switching waveform that are not ideal), such as deadtime, differences based on current direction, power module turn-on/turn-off delay, etc. In the non-linear operating conditions (e.g., high-speed and high-torque) of the powertrain 14 (e.g., six-step operation), current estimation errors can become large, which can result in an unacceptable torque error up to 15%. Further, systems that are not physics-based may thus need to be calibrated for different inverters or different motors.

In the present disclosure, the electrical power system 10 is configured to take into account the changes in duty cycle of a switching waveform, which may be related to a difference between the first duty cycle 17 and the second duty cycle 19. These duty cycle changes, for instance, may be handled by the embedded module 18, which may typically operate in the ECU 12. However, the control module 16 receives feedback (e.g., the second duty cycle 19) from the output of the embedded module 18 via the feedback loop 20 and hence is configured to consider certain features that are not normally considered, such as the duty cycle changes mentioned herein.

Also, the control module 16 is configured to consider other factors, such as switching non-idealities, Fundamental frequency to Switching frequency (F2S) ratios, among other parameters or metrics. With the control module 16 and feedback loop 20, the embedded module 18 is configured to provide more accurate duty cycle control, which may thereby result in more accurate DC current measurements of the powertrain 14 and more accurate torque estimates.

Utilizing the electrical power system 10 of the present disclosure, it is possible to achieve an accuracy in its estimations that remain substantially, even in non-linear six-step operating conditions. For example, it may be possible to achieve a much improved torque error of less than 5%. It may be noted that the higher the accuracy of the input current estimation, the higher the accuracy of the estimated torque, which therefore enables the ECU 12 (e.g., embedded module 18) to better satisfy functional torque demands.

According to various implementations, the ECU 12 may be configured to control the powertrain 14 as well as other electrical systems in a vehicle. The ECU 12 may operate in coordination with one or more other ECUs or processing devices in the vehicle. These ECUs (or processing devices) may include one or more of an Engine Control Module (ECM), a Powertrain Control Module (PCM), a Transmission Control Module (TCM), a Brake Control Module (BCM), a Central Control Module (CCM), a Central Timing Module (CTM), General Electronic Module (GEM), Body Control Module (BCM), Suspension Control Module (SCM), etc.

Figure 2:
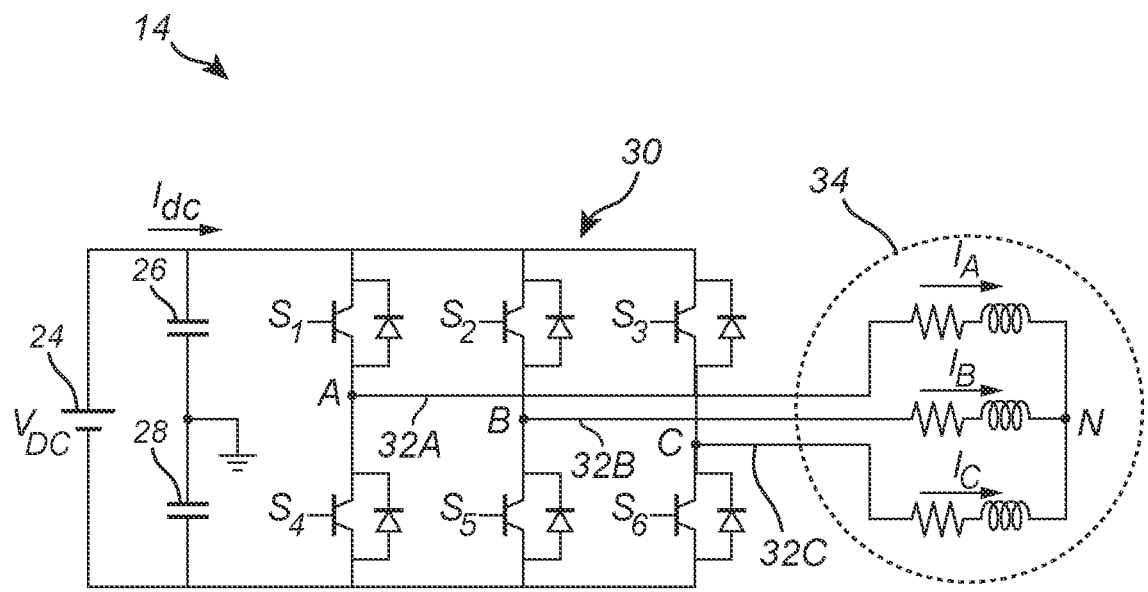
FIG. 2 is a schematic diagram illustrating a powertrain of the electrical power system of FIG. 1, according to various embodiments.

FIG. 2 is a schematic diagram illustrating an embodiment of the powertrain 14 (e.g., physical power plant, EDU, etc.) shown in FIG. 1. In this embodiment, the powertrain 14 includes a DC voltage supply 24, shunt capacitors 26, 28 (e.g., decoupling capacitors, DC link capacitors, etc.), power electronics circuit 30, bus bars 32A, 32B, 32C, and an electric motor 34. The power electronics circuit 30 includes three branches associated with phases A, B, and C. For each branch, the power electronics circuit 30 includes a pair of switches S and diodes D, such that two switches are associated with each of three phases A, B, C of the electric motor 34 to thereby enable a six-step operation.

The electric motor 34 includes three phases A, B, and C, where each phase includes series-connected resistors R and inductors L. The input currents of interest in the present disclosure include $I_A$, $I_B$, $I_C$, corresponding respectively to the three phases A, B, C. A DC current Ids is shown with respect to the DC voltage supply 24. It may be noted that in the environment of an electric vehicle, the electric motor 34 may be connected to a gearbox or transmission (not shown) for propelling the vehicle.

In some embodiments, the embedded module 18 may include "smart clamp" and deadtime, whereby deadtime refers to the portion of the time when the pair of switches for one phase (e.g., $S_1$ and $S_4$ of phase A) are both off. Because of the implementation of smart clamp and deadtime in the embedded module 18, the first duty cycle 17 may be different from the second duty cycle 19, which may be denoted as:

$$\text{duty\_cycle\_app} \neq \text{duty\_cycle\_final}$$

where duty_cycle_app is the first duty cycle 17 and duty_cycle_final is the second duty cycle 19.

By feeding the duty_cycle_final (i.e., second duty cycle 19) back to the control module 16, the control module 16 may thereby use the second duty cycle 19 to modify the duty_cycle_app (i.e., first duty cycle 17) as needed to control the input currents $I_A$, $I_B$, $I_C$ of the three phases more accurately. In this respect, the control module 16 may be configured to consider diverse types of switching non-idealities (e.g., deadtime, current direction, turn-on/turn-off behavior, etc.), as described in more detail below. Also, the control module 16 may be configured to consider the ratio between Fundamental frequency to Switching frequency (F2S ratio), as described in more detail below.

As defined in the present disclosure, the duty cycle (or power cycle) may refer to the portion of one period of a waveform during which a signal or system is active or on (e.g., set to one in a binary waveform). The duty cycle may be considered as the "signal-on time" and may be designated as a percentage or ratio. In some embodiments, the duty cycle ("D" or "α") may be expressed as:

$$D = PW/T \text{ (as a ratio) or}$$

$$D = PW/T \times 100\% \text{ (as a percentage)}$$

where PW is the pulse width (e.g., active time), and T is the total period of the signal.

The powertrain 14 (e.g., of an electric vehicle) may include an engine and/or an electric motor in addition to a drivetrain (not shown), which may include components that deliver power to the wheels of the vehicle. Also, in some embodiments, the powertrain 14 (e.g., Electric Drive Unit (EDU)) may include an electric motor, a power electronics module, and a transmission. For example, the transmission may be positioned between the electric motor and the power electronics module.

According to some embodiments of the present disclosure, the powertrain 14 may be a Variable-Frequency Drive (VFD) type of drive unit used in electro-mechanical drive systems to control the speed of the electric motor 34 and torque by varying motor input frequency. In other embodiments, the powertrain 14 may control associated voltages and/or currents, and may be referred to as an Adjustable-Frequency Drive (AFD), an Adjustable-Speed Drives (ASD), a Variable-Speed Drive (VSD), an AC drive, an inverter drive, etc.

For example, some inverter drives may be configured as "six-step" inverter drives. Six-step inverters in the present disclosure may be either Voltage Source Inverters (VSIs) or Current Source Inverters (CSIs) and may be referred to as variable-voltage inverter drives, Pulse-Amplitude Modulation (PAM) drives, square-wave drives, DC chopper inverter drives, or the like. In the six-step operation, the DC output may be smoothed via a capacitor bus and/or series-reactor connection to supply via Darlington Pair or Insulated-Gate Bipolar Transistor (IGBT) inverter quasi-sinusoidal, six-step voltage or current input to the electric motor 34 or induction motor.

Therefore, the ECU 12 (FIG. 1) may analyze duty cycle parameters of its outputs for controlling the powertrain 14. In particular, the input currents to the electric motor 34 can be estimated more accurately by taking the duty cycle parameters into account. The ECU 12 obtains the duty cycle parameter at its output (e.g., second duty cycle 19). This duty cycle parameter (e.g., second duty cycle 19) may relate to control actions (e.g., instructions, signals, or waveforms) enforced on the switches (e.g., $S_1$, $S_2$, $S_3$, $S_4$, $S_5$, $S_6$) of the power electronics circuit 30, which is described in more detail below. Based on the duty cycle parameter, the control module 16 of the ECU 12 can estimate the input current (i.e., $I_A$, $I_B$, $I_C$) provided to each of the three phases of the electric motor 34.

In some embodiments, the power electronics circuit 30 may include three branches for controlling the three phases of the electric motor 34, respectively. As shown in the embodiment of FIG. 2, each branch includes two switches (e.g., $S_1$ and $S_4$ in the A branch, $S_2$ and $S_5$ in the B branch, and $S_3$ and $S_6$ in the C branch). The switches are configured for controlling the respective phases to thereby allow the power electronics circuit 30 to employ the six-step operation. The ECU 12 may further be configured to obtain a duty cycle parameter for each of the three phases and then estimate an input current for each of the three phases based on the duty cycle parameter associated with each phase.

The step of obtaining the duty cycle parameter may include analyzing an input waveform applied to the switches, as described in more detail below. Furthermore, analyzing the input waveform may include taking switching non-idealities into account. For example, the switching non-idealities may include one or more of deadtime, a smart clamp function, current direction, non-linear turn-on delay, non-linear turn-off delay, and a Fundamental frequency to Switching frequency (F2S) ratio.

The ECU 12 may also be configured to feed the duty cycle parameter (e.g., second duty cycle 19) at the output of the ECU 12 to the control module 16 to compensate for these switching non-idealities. The ECU 12 may also be configured to estimate the torque of the electric motor 34 based on the input current estimations. The step of estimating the input current may further include the step of employing a trapezoidal estimation technique (e.g., described below with respect to FIGS. 5-7) based on an analysis of a trapezoidal area under a variable waveform of the input current.

II. Considering Switching Non-Idealities

Figure 3:
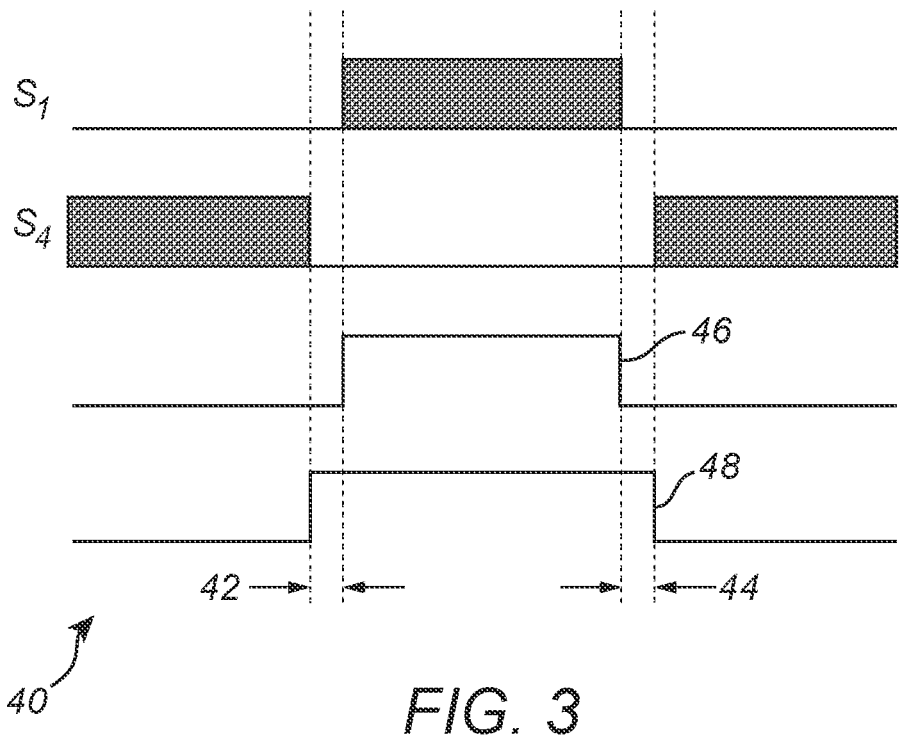
FIGS. 3 and 4 are graphs illustrating the switching states of two switches associated with one phase of the electric motor shown in FIG. 2 while accounting for different switching non-idealities, according to various embodiments.
Figure 4:
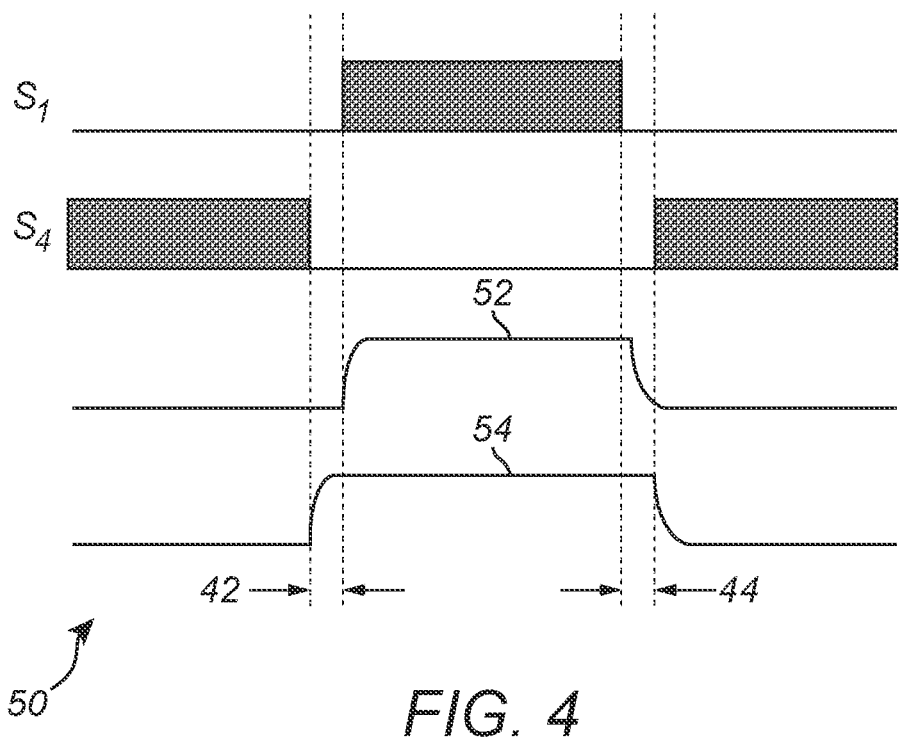

FIGS. 3 and 4 show graphs 40, 50 demonstrating the switching states of two switches associated with one phase of the electric motor 34. In this example, the switches $S_1$ and $S_4$ (corresponding to phase A) are shown in the graphs 40, 50. However, it may be noted that the switches $S_2$ and $S_5$ corresponding to phase B and/or switches $S_3$ and $S_6$ corresponding to phase C are likewise applicable and may have the same or similar waveforms as shown.

The graph 40 of FIG. 3 shows how the ECU 12 (or control module 16) can account for switching non-idealities, such as deadtime and current direction. Deadtime, for example, refers to the time after each event during which the system is not able to record another event. For example, a first deadtime 42 is the time between the end of the $S_4$ pulse and the start of the $S_1$ pulse. A second deadtime 44 is the time between the end of the $S_1$ pulse and the start of the next $S_4$ pulse For phase A, while considering deadtime and current direction, the $I_{dc}$ waveform 46 is defined by:

$$I_a>0 \Rightarrow I_{dc}=D_a*I_a$$

and the $I_{dc}$ waveform 48 is defined by:

$$I_a<0 \Rightarrow I_{dc}=(D_a+DT)*I_a$$

where $D_a$ is the duty cycle of phase A and DT is the power module deadtime.

The graph 50 of FIG. 4 shows how the ECU 12 (or control module 16) can account for switching non-idealities, such as power module turn-on/turn-off delay. In this case, the $I_{dc}$ waveform 52 includes non-linear turn-on delays at its rising edge and non-linear turn-off delays at its falling edge, whereby the $I_{dc}$ waveform 52 may be defined by:

$$I_a>0 \Rightarrow I_{dc}=(D_a+(T_{off(top)}-T_{on(top)})/2)*I_a$$

and the $I_{dc}$ waveform 54 may be defined by:

$$I_a<0 \Rightarrow I_{dc}=(D_a+DT-(T_{off(top)}-T_{on(top)})/2)*I_a$$

where $T_{off}$ is the power module "off" time and $T_{on}$ is the power module "on" time.

FIGS. 5A and 5B are graphs 60, 70 illustrating an embodiment of a method for calculating input current while considering the ratio between Fundamental frequency and Switching frequency (F2S). The graph 60 of FIG. 5A shows a waveform (e.g., an input waveform) 62 representing the switching frequency having a particular on time. A waveform 64 represents the fundamental frequency with currents I1 and I2. The graph of FIG. 5B shows a waveform 72 representing the switching frequency and includes similarities to the waveform 62. A waveform 74 represents the fundamental frequency with current I3 and includes similarities to the waveform 64. In this example, I1+I2=I3, whereby:

$$I1=D_a^{N-1} \times I_a^{n-1}$$

$$I2=D_a^N \times I_a^N$$

If switching frequency is much higher than fundamental frequency (i.e., low F2S ratio), the input current can be calculated as follows:

$$I_{dc} = D_a^{eff} \times I_a + D_b^{eff} \times I_b + D_c^{eff} \times I_c$$

The fundamental frequency may be defined as the lowest frequency of a periodic waveform, the lowest frequency sinusoidal in the sum of harmonically related frequencies, or the frequency of the difference between adjacent frequencies. The switching frequency refers to the rate at which an electronic switch performs its function.

FIGS. 6A-6C are graphs 80, 90, 100 illustrating an embodiment of a method for calculating input current using a trapezoidal estimation approach while considering the F2S ratio. In this example, I1+I2≠I3. The current I3 of FIG. 6B is equal to the current $I_{trap}$ of FIG. 6C. However, the equation I1+I2=I3 with respect to FIGS. 5A and 5B would not necessarily be correct once the switching frequency becomes comparable with the fundamental frequency (e.g., comparable F2S ratio). In this example:

$$I1 = D_a^{N-1} \times I_a^{N-1}$$

$$I2 = D_a^N \times I_a^N$$

III. Mathematical Derivations

FIG. 7 is a graph 110 illustrating an embodiment of the trapezoidal estimation method. An odd-switching half-cycle is defined as a rising side of a Pulse Width Modulation (PWM) carrier, which includes reducing the average power delivered by an electrical signal by dividing it up into discrete parts. An even-switching half-cycle is defined as falling side of the PWM carrier. A formula can be mathematically derived as follows:

$$I_{M_{even}} = I_{N-1} + \left(\frac{I_N - I_{N-1}}{Tsw}\right) \times D \times Tsw = I_{N-1} + D(I_N - I_{N-1})$$

$$I_{M_{odd}} = I_N - \left(\frac{I_N - I_{N-1}}{Tsw}\right) \times D \times Tsw = I_N - D(I_N - I_{N-1})$$

$$I_{even,eff} = \frac{(I_{N-1} + I_{M_{even}})}{2} \times D = \frac{(I_{N-1} + I_{N-1} + D(I_N - I_{N-1}))}{2} \times D$$

$$I_{odd,eff} = \frac{(I_N + I_{M_{odd}})}{2} \times D = \frac{(I_N + I_N - D(I_N - I_{N-1}))}{2} \times D$$

The trapezoidal estimation method may utilize the following:

$$I_{even,eff} = \left(I_{N-1} + D \times \left(\frac{I_N - I_{N-1}}{2}\right)\right) \times D$$

$$I_{odd,eff} = \left(I_N - D \times \left(\frac{I_N - I_{N-1}}{2}\right)\right) \times D$$

$$I_{trap,eff} = I_{odd,eff} + I_{even,eff}$$

IV. Dyno Testing

Figure 8:
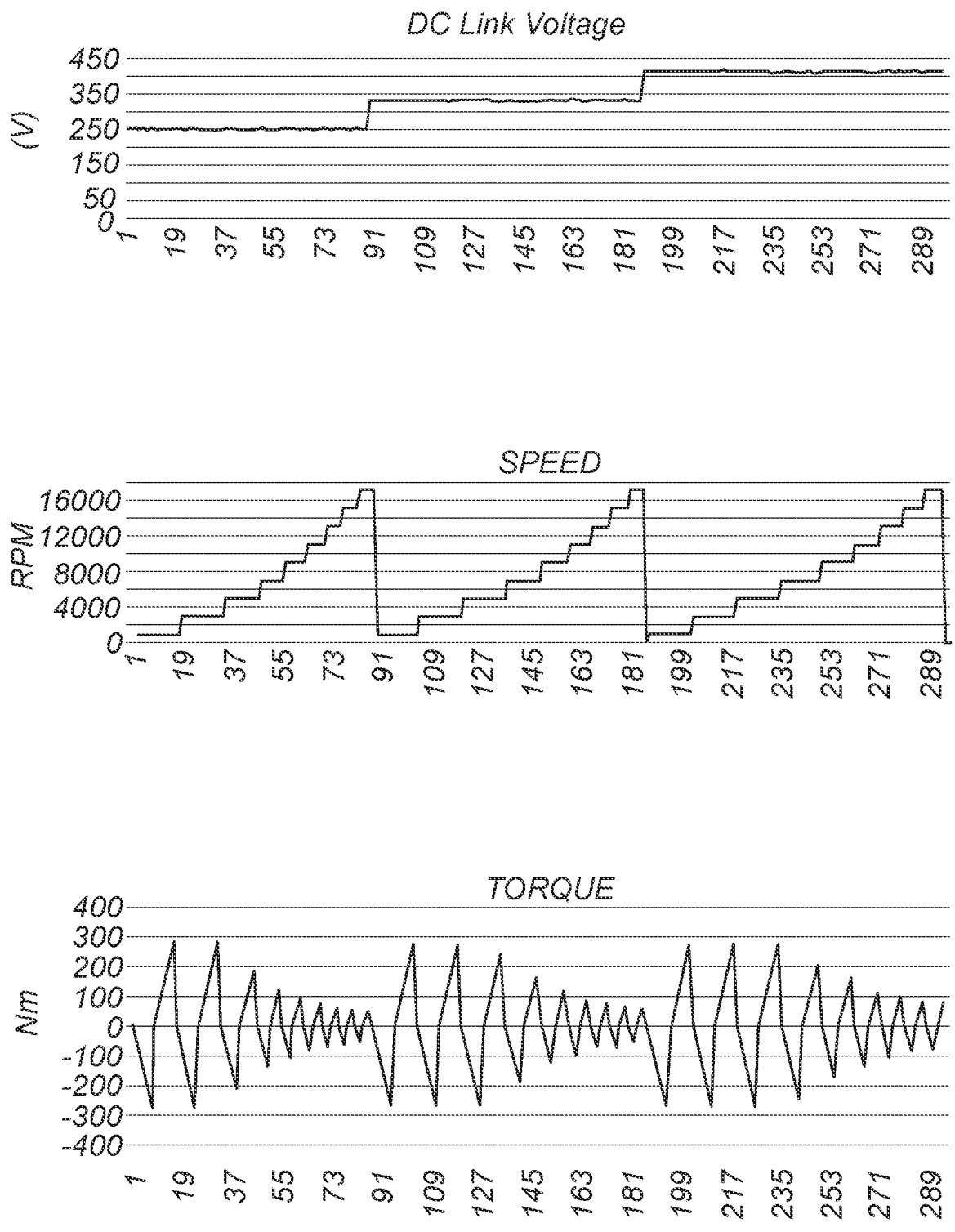
FIG. 8 is a graph showing test results observed with respect to the current estimation methods of FIGS. 5-7, according to various embodiments.

FIG. 8 is a screenshot of a graph 120 showing an example of test results observed with respect to the current estimation methods of FIGS. 5-7. The test results are the product of a dynamometer (or "dyno" for short), which is a device for simultaneously measuring the torque and rotational speed (in Revolutions Per Minute (RPM)) of the electric motor under test. The instantaneous power, DC link voltage, and other parameters may be calculated. The methods described in the present disclosure were tested on a high-speed dyno over a wide range of operating points, such as speed, torque, and DC voltage. An error may be calculated from an estimated input current minus a measured input current. This error is compared in FIGS. 9 and 10.

It may be noted from the graph 120 that the methods can provide accurate data for other ECUs that use this data (e.g., a Battery Management System (BMS), a Vehicle Dynamic Module (VDM), or the like).

Figure 9:
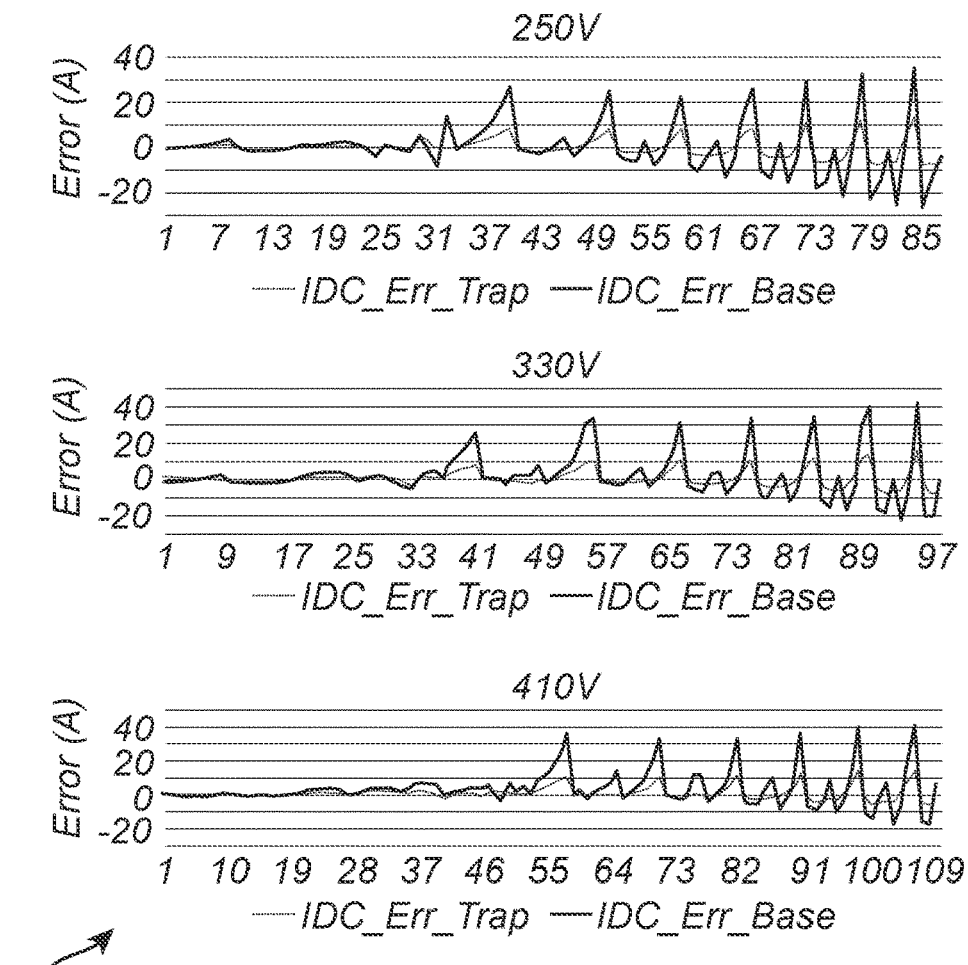
FIGS. 9 and 10 are graphs showing the reduction in an error metric regarding the test results observed with respect to the current estimations methods of FIGS. 5-7 using an Insulated-Gate Bipolar Transistor (IGBT) Dual-Power Inverter Module (DPIM), according to various embodiments.
Figure 10:
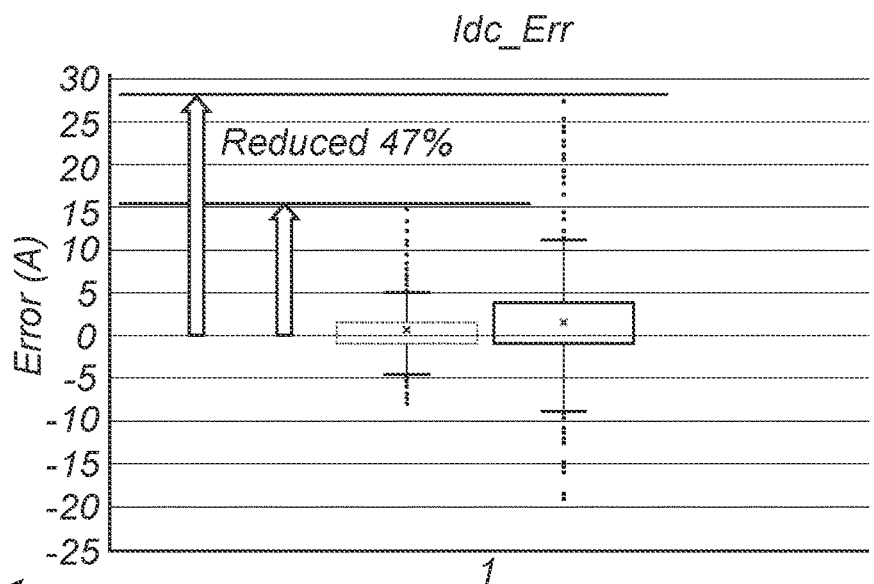

FIGS. 9 and 10 are screenshots of graphs 130, 140 showing an example of the reduction in an error metric regarding the test results shown in FIG. 8, which were observed with respect to the current estimations methods of FIGS. 5-7. In this test, an Insulated-Gate Bipolar Transistor (IGBT) Dual-Power Inverter Module (DPIM) was utilized in the dyno test. For the IGBT DPIM test, the methods of the present disclosure were able to improve the input current estimation accuracy by 47%. The IGBT can be used as an electronic switch for switching power supplies in high-power applications, such as, in this case, the electric vehicle under test. The DPIM converts alternating current into direct current, and vice versa, and helps to control and shift the transmission.

Figure 11:
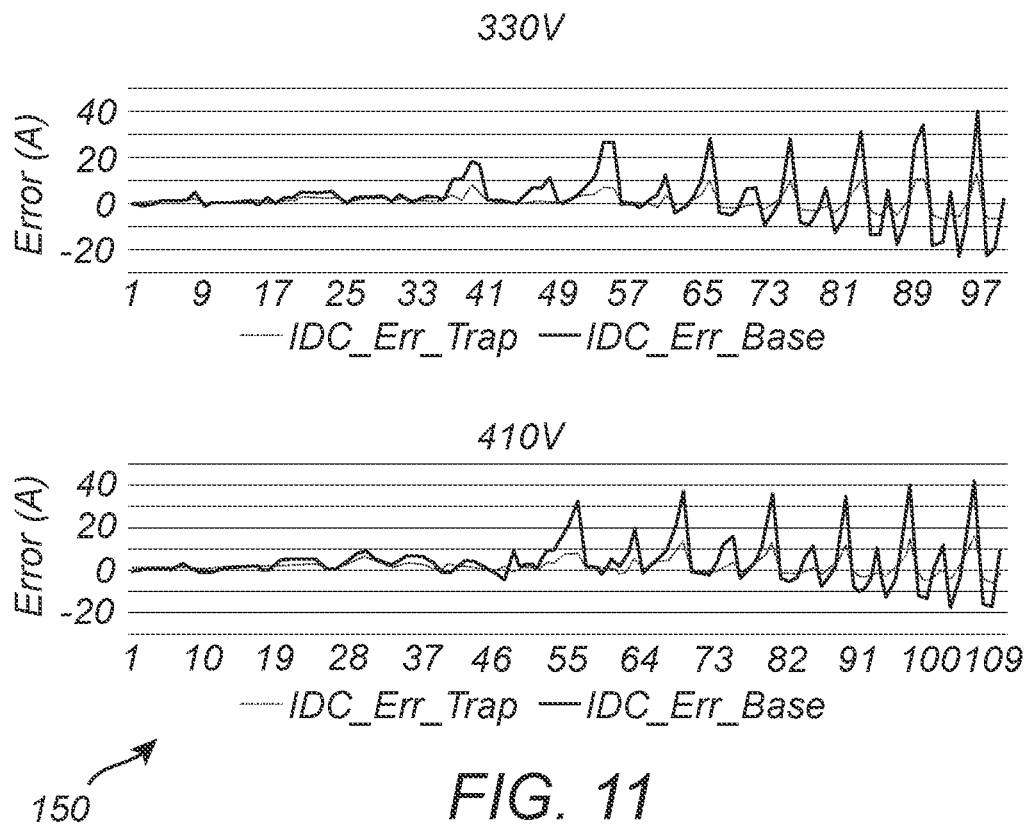
FIGS. 11 and 12 are graphs showing the reduction in an error metric regarding the test results observed with respect to the current estimations methods of FIGS. 5-7 using a Silicon Carbide (SiC) DPIM, according to various embodiments.
Figure 12:
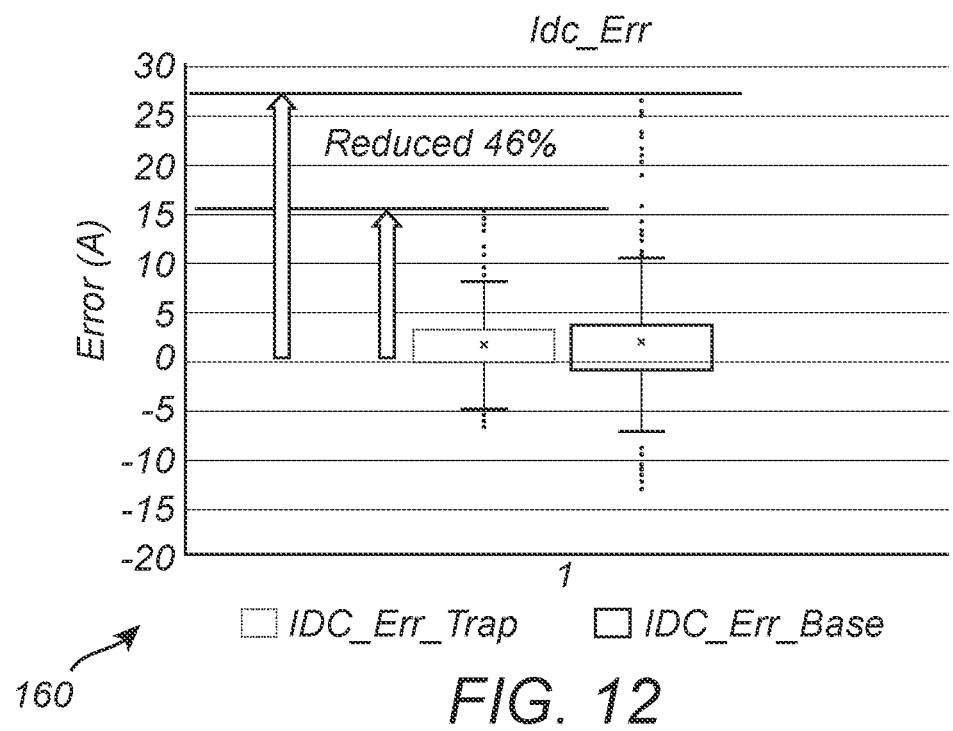

FIGS. 11 and 12 are screenshots of graphs 150, 160 showing an example of the reduction in an error metric regarding the test results shown in FIG. 8, which were observed with respect to the current estimations methods of FIGS. 5-7. In this test, a Silicon Carbide (SiC) DPIM was utilized in the dyno test. For the SiC DPIM test, the methods of the present disclosure were able to improve the input current estimation accuracy by 46%.

Figure 13:
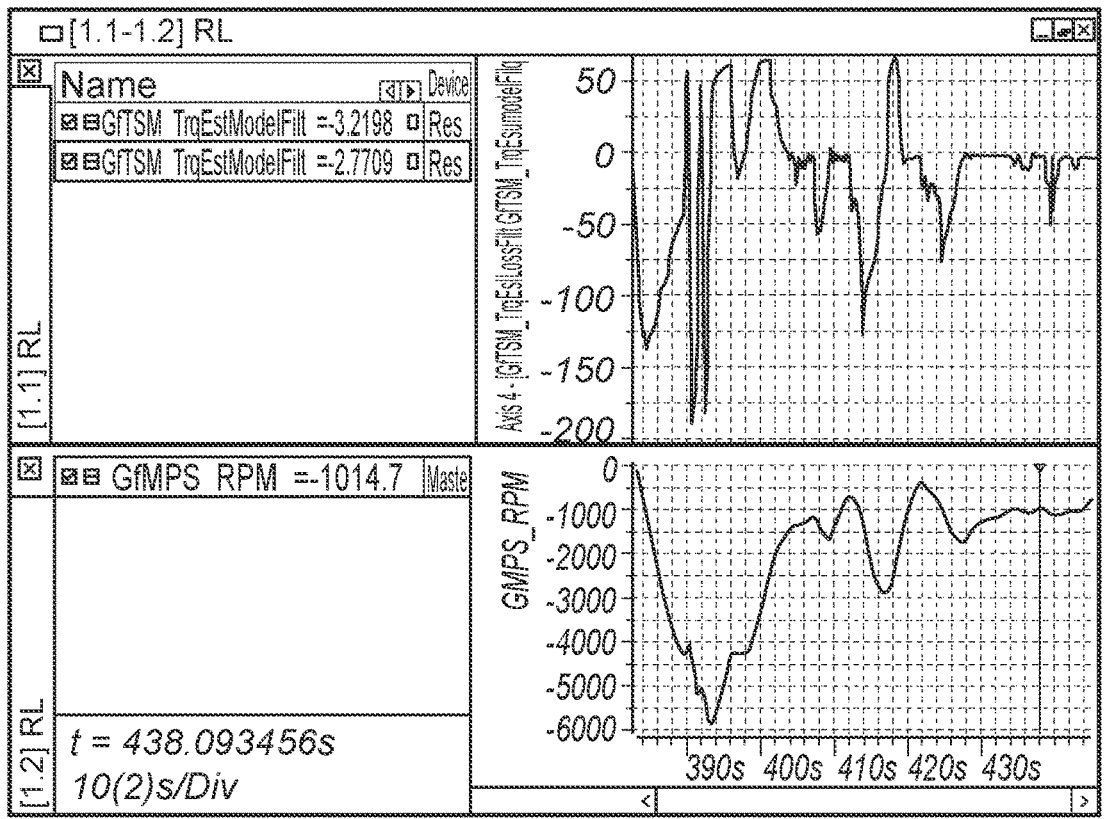
FIG. 13 is a graph showing test results that demonstrate a match between a loss-based torque estimation and a model-based torque estimation using an IGBT DPIM, according to various embodiments.

FIG. 13 is a screenshot of a graph 170 showing an example of test results that demonstrate a match between a loss-based torque estimation and a model-based torque estimation using an IGBT DPIM. The embodiments of the methods of the present disclosure produced results having a close match between loss-based torque estimation and model-based torque estimation.

Figure 14:
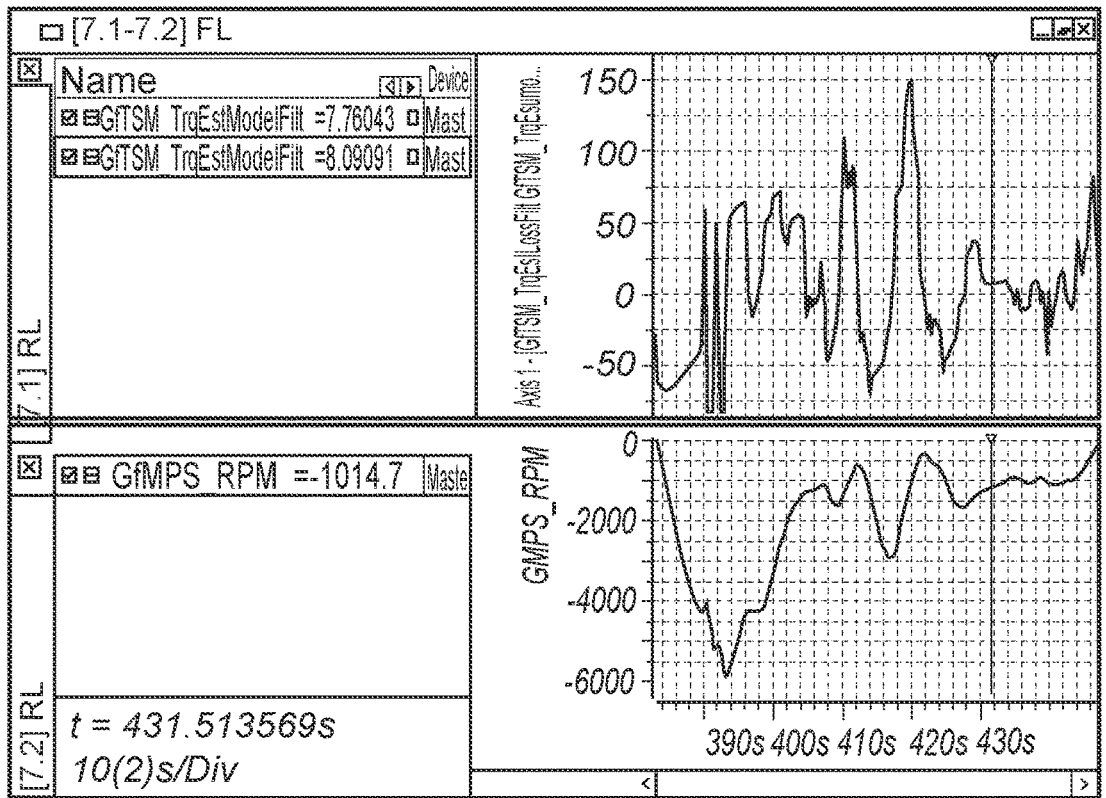
FIG. 14 is a graph showing test results that demonstrate a match between a loss-based torque estimation and a model-based torque estimation using a SiC DPIM, according to various embodiments.

FIG. 14 is a screenshot of a graph 180 showing an example of test results that demonstrate a match between a loss-based torque estimation and a model-based torque estimation using a SiC DPIM. The embodiments of the methods of the present disclosure produced results having a close match between loss-based torque estimation and model-based torque estimation.

V. Additional Embodiments

Figure 15:
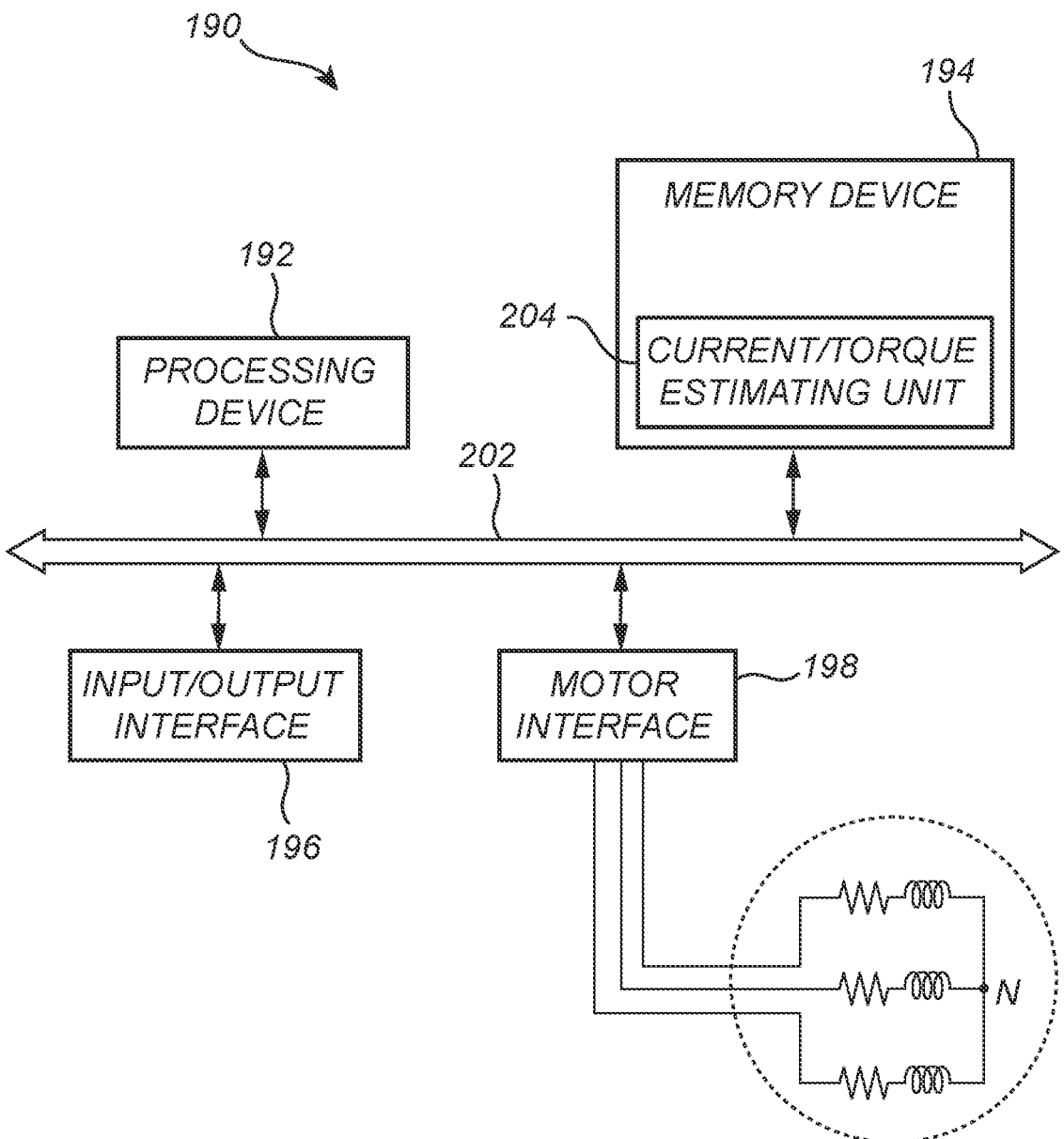
FIG. 15 is a block diagram illustrating a computing device for controlling an electric motor, according to various embodiments.

FIG. 15 is a block diagram illustrating an embodiment of a computing device 190 for controlling an electric motor of an electric vehicle. In some respects, the computing device 190 may include some similarities to the electrical power system 10 of FIG. 1. In the illustrated embodiment, the computing device 190 may be a digital computing device that generally includes a processing device 192, a memory device 194, Input/Output (I/O) interfaces 196, and a motor interface 198 (e.g., power electronic circuit). It should be appreciated that FIG. 15 depicts the computing device 190 in a simplified manner, where some embodiments may include additional components and suitably configured processing logic to support known operating features. The components (i.e., 192, 194, 196, 198) may be communicatively coupled via a local interface 202. The local interface 202 may include, for example, one or more buses or other wired or wireless connections. The local interface 202 may also include controllers, buffers, caches, drivers, repeaters, receivers, among other elements, to enable communication. Further, the local interface 202 may include address, control, and/or data connections to enable appropriate communications among the components 192, 194, 196, 198.

It should be appreciated that the processing device 192, according to some embodiments, may include or utilize one or more generic or specialized processors (e.g., microprocessors, ECUs, ECMs, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 192 may also include or utilize stored program instructions (e.g., stored in hardware, software, and/or firmware) for control of the computing device 190 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 194 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 194 may incorporate electronic, magnetic, optical, and/or other types of storage media. The memory device 194 may have a distributed architecture, where various components are situated remotely from one another, but can be accessed by the processing device 192.

The memory device 194 may include a data store, database, or the like, for storing data. In one example, the data store may be located internal to the computing device 190 and may include, for example, an internal hard drive connected to the local interface 202 (e.g., Controller Area Network (CAN) bus) in the computing device 190. Additionally, in another embodiment, the data store may be located external to the computing device 190 and may include, for example, an external hard drive connected to the Input/Output (I/O) interfaces 196 (e.g., SCSI or USB connection). In a further embodiment, the data store may be connected to the computing device 190 through a network and may include, for example, a network attached file server.

Software stored in the memory device 194 may include one or more programs, each of which may include an ordered listing of executable instructions for implementing logical functions. The software in the memory device 194 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 192), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 192 or other suitable circuitry or logic). For example, when executed, the instructions may cause or enable the processing device 192 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 192), or any suitable combination thereof. Software/firmware modules may reside in the memory device 194, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 196 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 196 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The motor interface 198 may be used to enable the computing device 190 to communicate over a local vehicle network for providing power output signals to the electric motor. The motor interface 198 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The motor interface 198 may include address, control, and/or data connections to enable appropriate communications on the vehicle network.

The processing device 192 (e.g., ECUs, CPUs, etc.) may include multiple processors that can be referred to collectively as the vehicle's computer. In some embodiments, the processing device 192 may incorporate several individual control modules (e.g., a PCM, TCM, etc.). Some vehicles may be manufactured with dozens if not hundreds of ECUs. Also, the embedded module 18 (FIG. 1) may include embedded software stored in the memory device 194.

In some embodiments, the computing device 190 may include a current/torque estimation unit 204. The current/torque estimation unit 204, according to some implementations, may include the control module 16, embedded module 18, and feedback loop 20 shown in FIG. 1. The current/torque estimation unit 204 may be configured in any suitable combination of hardware in the processing device 192 and software or firmware that is stored in the memory device 194 or other suitable non-transitory computer-readable media. The current/torque estimation unit 204 may include instructions for enabling the processing device 192 to perform various functions to estimate the torque of the electric motor of interest, such as by using the various methods described throughout the present disclosure.

Figure 16:
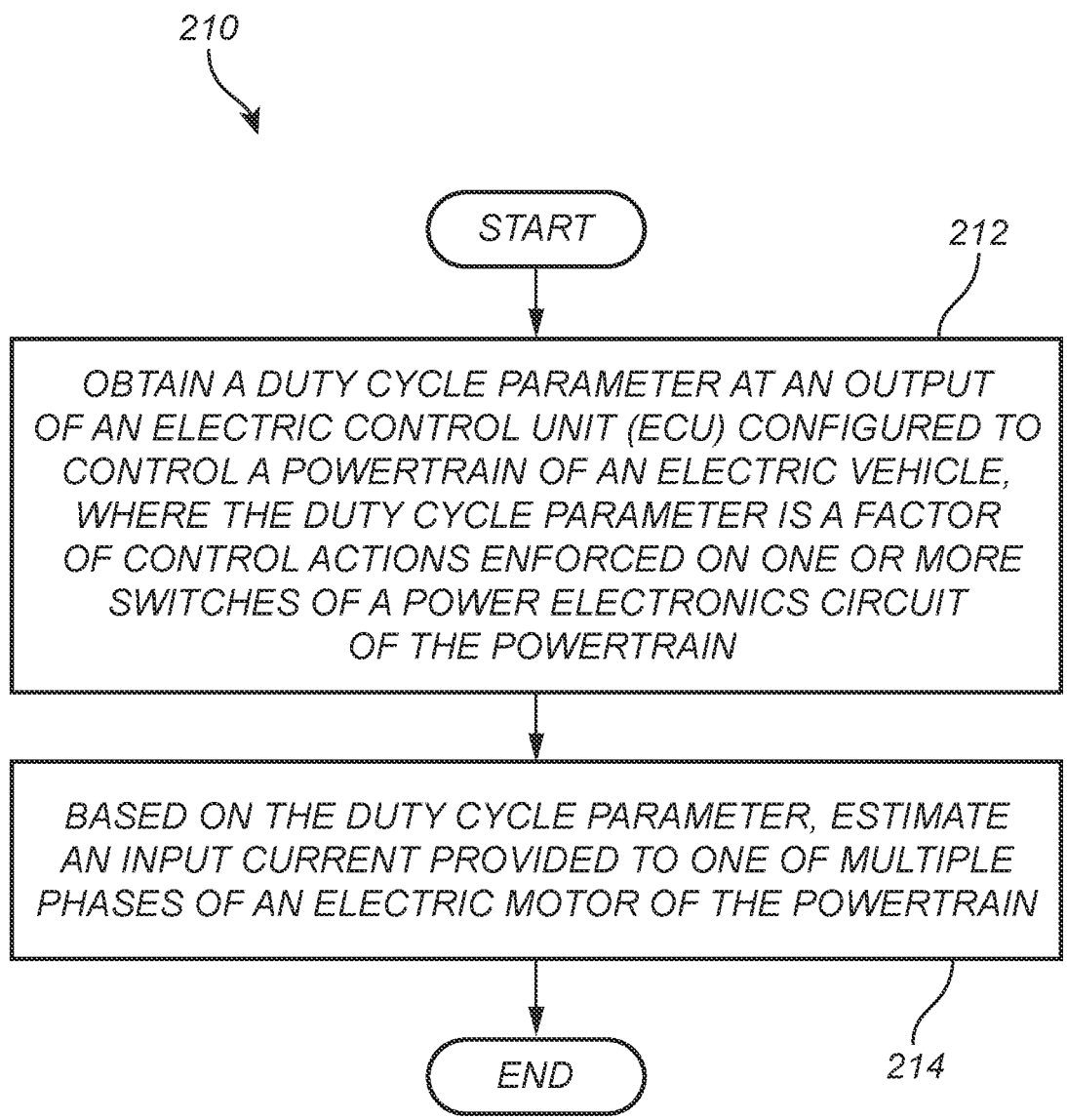
FIG. 16 is a flow diagram illustrating a process for controlling an electric motor, according to various embodiments.

FIG. 16 is a flow diagram illustrating an embodiment of a process 210 for controlling an electric motor. The process 210 includes the step of obtaining a duty cycle parameter at an output of an Electric Control Unit (ECU) (e.g., ECU 12) configured to control a powertrain (e.g., powertrain 14) of an electric vehicle, as indicated in block 212. The duty cycle parameter may relate to control actions enforced on one or more switches (e.g., $S_1$, $S_2$, $S_3$, $S_4$, $S_5$, $S_6$) of a power electronics circuit (e.g., power electronics circuit 30) of the powertrain. Based on the duty cycle parameter, the process 210 is further configured to estimate an input current provided to one of multiple phases of an electric motor (e.g., electric motor 34) of the powertrain, as indicated in block 214.

In some embodiments, the power electronics circuit may include three branches for controlling three phases of the electric motor, respectively, and wherein each branch includes two switches for controlling the respective phase to thereby allow the power electronics circuit to employ a six-step operation. The process 210 may further include obtaining a duty cycle parameter for each of the three phases and estimating an input current for each of the three phases based on the duty cycle parameter associated with each phase.

The step of obtaining the duty cycle parameter (block 212) may include analyzing an input waveform applied to the one or more switches. Furthermore, analyzing the input waveform may include taking switching non-idealities into account. For example, the switching non-idealities may include one or more of deadtime, a smart clamp function, current direction, non-linear turn-on delay, non-linear turn-off delay, and a Fundamental frequency to Switching frequency (F2S) ratio.

The process 210 may further include the step of feeding the duty cycle parameter at the output of the ECU to a control module (e.g., control module 16) of the ECU to compensate for switching non-idealities. The process 210 may also include estimating torque of the electric motor based on the input current estimation. The step of estimating the input current (step 214) may further include the step of employing a trapezoidal estimation technique based on an analysis of a trapezoidal area under a variable waveform of the input current.

In conclusion, the systems and methods of the present disclosure may include a three-phase inverter structure. In the absence of a current sensor (in hardware) for measuring an input current of a drive unit (e.g., powertrain 14), proof of the existence of the present systems and methods may be found be increasing the speed of the drive unit toward its maximum speed range while applying torque. Then, the output terminal voltages of the drive unit can be detected using external voltage sensors to confirm if it is using the six-step operation at high speeds. Proving the existence may include finding the critical speed points of the drive unit (e.g., the speed range in which the drive unit operates) in a linear range at low torque and then switching to the six-step operation at higher torques. Measurements of the input current of the operational drive unit can be taken with an external accurate current sensor (at different torque and speeds). These measurements can be compared with the transmitting data on the local interface (e.g., CAN bus) to find input current signals. The discovery may then include operating the drive unit in critical speeds points and increasing the torque of the drive unit from zero to full torque as a linear function of time. The input current signals on the CAN bus can be recorded as well as a detection of its linear (e.g., PWM) and non-linear (e.g., six-step) operation based on its sensed terminal voltages. Then, the discovery process may include confirming linear behavior of the input current estimation of the unit at the moment of switching from PWM to six-step operation. The process may then be repeated on other motors and confirming the independence of accurate input current signal from the motor (no calibration involved).

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system, comprising:
   one or more processing devices, and
   a memory device configured to store a computer program having instructions that, when executed, enable the one or more processing devices to:
   determine a change in duty cycle of a switching waveform applied to one or more switches of a power electronics circuit of a motor system, the change in duty cycle being based on a difference between a first duty cycle of an output of a control module of an electronic control unit (ECU) configured to control the motor system and a second duty cycle of an output of an embedded module of the ECU that is fed back from the embedded module to the control module via a feedback loop in the ECU;
   obtain, based at least in part on the change in duty cycle of the switching waveform, a duty cycle parameter at an output of the ECU, wherein the duty cycle parameter relates to control actions enforced on the one or more switches; and
   estimate, based on the duty cycle parameter obtained at the output of the ECU, an input current provided to one of multiple phases of an electric motor of the motor system.

2. The system of claim 1, wherein the power electronics circuit includes three branches for controlling three phases of the electric motor, respectively, and wherein each branch includes two switches for controlling a respective phase of the multiple phases to thereby allow the power electronics circuit to employ a six-step operation.

3. The system of claim 2, wherein the instructions further enable the one or more processing devices to:
   obtain a separate duty cycle parameter for each of the three phases, and
   estimate an input current for each of the three phases based on the separate duty cycle parameter associated with each phase.

4. The system of claim 1, wherein obtaining the duty cycle parameter includes analyzing the switching waveform applied to the one or more switches.

5. The system of claim 4, wherein analyzing the switching waveform includes taking switching non-idealities into account.

6. The system of claim 5, wherein the switching non-idealities includes one or more of deadtime, a smart clamp function, current direction, non-linear turn-on delay, non-linear turn-off delay, and a Fundamental frequency to Switching frequency (F2S) ratio.

7. The system of claim 1, wherein the instructions further enable the one or more processing devices to feed the duty cycle parameter obtained at the output of the ECU to a control module of the ECU to compensate for switching non-idealities.

8. The system of claim 1, wherein the instructions further enable the one or more processing devices to estimate torque of the electric motor based on the input current estimation.

9. The system of claim 1, wherein estimating the input current further includes employing a trapezoidal estimation technique based on an analysis of a trapezoidal area under a variable waveform of the input current.

10. An Electric Control Unit (ECU) configured to control a motor system, the ECU configured to store computer logic having instructions that, when executed, cause one or more processing devices to:
   determine a change in duty cycle of a switching waveform applied to one or more switches of a power electronics circuit of the motor system, the change in duty cycle being based on a difference between a first duty cycle of an output of a control module of the ECU and a second duty cycle of an output of an embedded module of the ECU that is fed back from the embedded module to the control module via a feedback loop in the ECU;
   obtain, based at least in part on the change in duty cycle of the switching waveform, a duty cycle parameter at an output of the ECU, wherein the duty cycle parameter relates to control actions enforced on the one or more switches; and
   estimate, based on the duty cycle parameter obtained at the output of the ECU, an input current provided to one of multiple phases of an electric motor of the motor system.

11. The ECU of claim 10, wherein the power electronics circuit includes three branches for controlling three phases of the electric motor, respectively, and wherein each branch includes two switches for controlling a respective phase of the multiple phases to thereby allow the power electronics circuit to employ a six-step operation.

12. The ECU of claim 11, wherein the instructions further enable the one or more processing devices to
   obtain a separate duty cycle parameter for each of the three phases, and
   estimate an input current for each of the three phases based on the separate duty cycle parameter associated with each phase.

13. The ECU of claim 10, wherein obtaining the duty cycle parameter includes analyzing the switching waveform applied to the one or more switches.

14. The ECU of claim 13, wherein analyzing the switching waveform includes taking switching non-idealities into account.

15. The ECU of claim 14, wherein the switching non-idealities includes one or more of deadtime, a smart clamp function, current direction, non-linear turn-on delay, non-linear turn-off delay, and a Fundamental frequency to Switching frequency (F2S) ratio.

16. A method, comprising:
   determining a change in duty cycle of a switching waveform applied to one or more switches of a power electronics circuit of a motor system, the change in duty cycle being based on a difference between a first duty cycle of an output of a control module of an electronic control unit (ECU) configured to control the motor system and a second duty cycle of an output of an embedded module of the ECU that is fed back from the embedded module to the control module via a feedback loop in the ECU;
   obtaining, based at least in part on the change in duty cycle of the switching waveform, a duty cycle parameter at an output of the ECU, wherein the duty cycle parameter relates to control actions enforced on the one or more switches; and
   estimating, based on the duty cycle parameter obtained at the output of the ECU, an input current provided to one of multiple phases of an electric motor of the motor system.

17. The method of claim 16, wherein the power electronics circuit includes three branches for controlling three phases of the electric motor, respectively, and wherein each branch includes two switches for controlling a respective phase of the multiple phases to thereby allow the power electronics circuit to employ a six-step operation.

18. The method of claim 17, further comprising:
   obtaining a separate duty cycle parameter for each of the three phases; and
   estimating an input current for each of the three phases based on the separate duty cycle parameter associated with each phase.

19. The method of claim 16, further comprising feeding the duty cycle parameter obtained at the output of the ECU to a control module of the ECU to compensate for switching non-idealities.

20. The method of claim 16, further comprising estimating torque of the electric motor based on the input current estimation.

* * * * *